United States Patent [19]

Kato et al.

[11] Patent Number: 5,195,073
[45] Date of Patent: Mar. 16, 1993

[54] APPARATUS FOR SELECTIVELY RECORDING ANALOG AND DIGITAL DATA ON AN OPTICAL DISC

[75] Inventors: Misao Kato, Katano; Yoshinori Amano, Takatsuki; Yoshio Hirauchi, Osaka; Mari Kimura, Kishiwada; Kunihiko Hontani, Settsu, all of Japan

[73] Assignee: Matsushita Electric Industrial Co., Ltd., Kadoma, Japan

[21] Appl. No.: 623,506

[22] Filed: Dec. 7, 1990

[30] Foreign Application Priority Data

Dec. 14, 1989 [JP] Japan ................................. 1-325070

[51] Int. Cl.⁵ .................. G11B 5/09; G11B 15/52; G11B 20/10; G11B 27/22
[52] U.S. Cl. ........................... 369/47; 369/116; 358/342
[58] Field of Search ............... 358/342, 343; 369/47, 369/48, 49, 322, 116, 44.38, 44.39; 360/18, 19.1, 32

[56] References Cited

U.S. PATENT DOCUMENTS

| | | | |
|---|---|---|---|
| 4,049,909 | 9/1977 | Peck | 375/67 |
| 4,167,023 | 9/1979 | Bessette et al. | 360/10.2 |
| 4,544,962 | 10/1985 | Kato et al. | 360/40 |
| 4,598,395 | 7/1986 | Smith | 358/342 |
| 4,633,330 | 12/1986 | Yamamitsu et al. | 358/310 |
| 4,692,816 | 9/1987 | Sugiyama et al. | 358/343 |
| 4,796,097 | 1/1989 | Mashimo | 369/116 |
| 4,800,446 | 1/1989 | Kanamaru | 358/342 |
| 4,829,497 | 5/1989 | Sako et al. | 369/48 |
| 4,894,732 | 1/1990 | Ueda | 358/342 |
| 5,027,222 | 6/1991 | Shinbo et al. | 358/342 |

FOREIGN PATENT DOCUMENTS

64-19556 1/1989 Japan .

Primary Examiner—Jeffery A. Brier
Assistant Examiner—Thai Tran
Attorney, Agent, or Firm—Spencer, Frank & Schneider

[57] ABSTRACT

In an optical disc device including an optical disc, a device for selectively processing and recording on the optical disc analog and digital input signals includes analog modulation circuitry for receiving analog input signals and producing modulated analog output signals, block forming circuitry for receiving digital input signals, partitioning the digital input signals into sectors containing sector data, adding error code data to each sector, and producing sector data signals, and digital modulation circuitry for receiving the sector data signals, digitally modulating the sector data signals to suppress low-frequency components, encoding the sector data signals, and producing encoded modulated digital output signals. Selection circuitry receives an external signal indicative of whether the input signals are analog or digital input signals, selects one of the modulated analog output signals and the encoded modulated digital output signals based on the external signal, and produces a selection signal indicating which of the output signals is selected. Recording circuitry receives and amplifies the output signal selected by the selection circuitry, receives the selection signal from the selection circuitry, filters the amplified signal based on the selection signal, and records the amplified filtered signal on the optical disc.

7 Claims, 4 Drawing Sheets

APPARATUS FOR SELECTIVELY RECORDING ANALOG AND DIGITAL DATA ON AN OPTICAL DISC

BACKGROUND OF THE INVENTION

This invention relates to apparatus for recording various information such as characters, figures, images and audio sound on a disc-like recording medium such as an optical disc.

Magnetic recording media such as magnetic tapes and magnetic discs are widely used in the auxiliary memories for computers. In recent years, auxiliary memory using optical magnetic media, particularly optical discs has become the object of public attention because the optical magnetic media can record information at a much greater density than the magnetic recording media.

In the fields of information service and so on, there is a demand for an image filing apparatus which can conveniently make and store data from still pictures or moving pictures. Particularly, there is a strong demand for an image filing apparatus capable of recording information for characters and figures and image information for still pictures or moving pictures on one disc and capable of processing such information. Also, an optical disc has the features of large capacity and random access and is thus suited as a recording medium for such information.

The information to be processed in the above new field can be roughly classified into information for characters, figures, audio sound and still pictures of which the capacity is relatively small even in codes, and image information of moving pictures or the like, of which the capacity is large. In the conventional code information recording apparatus using optical discs, units of constant amounts of data are digitally recorded on a large number of sectors each of an equal recording capacity each into which track of the disc is divided for random access and information on each sector is added with an error correction code for improving the reliability of the information. In this case, since the signal has low frequency components close to DC in its frequency spectrum, a DC coupling laser recording circuit is used. On the other hand, when image information such as moving pictures is recorded, it is necessary to access each unit of field or frame, and thus each track of the disc includes one or two sectors for recording analog signals unlike those recording code information. In this case, since, before recording, the analog signal is generally frequency-modulated into a signal with no DC component, an AC-coupled (for cutting the components close to DC) laser recording circuit is used. Thus, the conventional optical disc recording apparatus processes coded information such as characters, digitally figures and image information, such as moving pictures, as an analog signal, respectively and records them in different formats, and through different laser recording circuits on separate discs, because these different forms of information have their own properties.

Therefore, when the code information and image information are simultaneously edited and processed, separate optical disc recording apparatus must be used at the same time. Moreover, there is the problem that different management of information and control of the recorders is necessary between different recording media. To cope with this problem, apparatus for recording different information on one disc of an existing medium has been considered. For example, on the laser disc moving pictures and audio sounds are recorded as analog signals, and another audio sound as a digital signal in a frequency divided manner. As to the compact disc (CD), audio sounds and still pictures are recorded as digital signals on a single optical disc. These discs, however, are always used as recorded discs to be repeatedly reproduced, and cannot be used for recording the information individually and independently. For example, it is impossible to record still pictures and later record audio sound. In Japanese Patent laid-open publication No. 64-19556, an optical disc recording apparatus for recording analog and digital signals together is disclosed, but the laser recording circuit is not described which considers the difference between the frequency bands of the analog and digital signals to be recorded, particularly the processing of low-frequency components having a large effect on the servo characteristics.

In addition, from the standpoint of information quality it is desired to record all information in digital signals because digital signals are not deteriorated by processing such as editing. However, aside from still pictures, information of moving pictures are difficult to digitize because even NTSC moving pictures, when digitized, must be recorded at a rate as high as 60 mega-bits/sec, which is another difficulty. In order to record information of characters and figures and the moving pictures on one optical disc through a single recording circuit, it is necessary to use a laser recording circuit through which these types of information can be recorded at a higher rate, or 60 mega-bits/sec. To do this, it is necessary to use a special high-performance pickup having a high-output power semiconductor laser and a wide-band drive circuit for this laser. On the other hand, since with character and figure it is never necessary to record at such a high rate, reducing the amount of information for moving pictures by the use of an image compression technique and recording at a low rate can be considered. However, the technique of image compression with less deterioration of picture quality is still being studied and developed. In either case, encoding all kinds of information including moving pictures, and recording those in a uniform manner has presented many technical problems.

SUMMARY OF THE INVENTION

It is an object of the invention to provide an optical disc recording apparatus capable of recording and processing various kinds of information such as moving pictures, still pictures, audio sound, characters and figures in a uniform manner. For this purpose, it is important to distinguish various kinds of information as code information and image information and treat them accordingly. Also, it is necessary to selectively process and record the information in suitable form considering the recording media and the amount of information.

According to this invention, there is provided, in order to achieve the above object of this invention, an optical disc recording apparatus for recording an input analog or digital signal, comprising an analog modulation circuit for modulating an analog signal in a manner suitable for optical disc recording, a digital modulation circuit for dividing the digital signal into blocks and modulating them in a manner suitable for optical disc recording, a control circuit for producing a control signal depending on an analog or digital signal, a selection circuit for selecting one of input analog and digital modulated signals in accordance with the control signal from the control circuit and producing the selected signal, and a recording circuit for selectively differently limiting the frequency band of the input signal in accordance with a selection signal and supplying it to a laser drive circuit, so that the signal can be recorded on the optical disc.

Moreover, the recording circuit comprises an amplifying circuit for amplifying the input signal, a frequency band limiting circuit which is responsive to a selection signal indicating that the input signal is an analog or digital signal, to selectively limit the band of the input signal, and the laser drive circuit for driving a laser in accordance with the output signal from the frequency band limiting circuit.

The selection signal for determining the band limit of the input signal includes two different selection signals for the recording of analog signals, and for the recording of digital signals. If, for example, the input signal is an analog signal of moving pictures, the band limit for analog recording is selected by a first selection signal, and the band-limited input signal is recorded on the optical disc. If the input signal is a digital signal of audio sound, still pictures and characters, the band limit for digital recording is selected by the other selection signal, and the band-limited input signal is recorded on the optical disc.

Moreover, another optical disc recording apparatus can be provided which further comprises a high-speed digital modulation circuit for fast dividing a digital signal into blocks and modulating them in a manner suitable for optical disc recording, and an exclusive-use high-speed recording circuit for fast recording the digital signal, thereby enabling data to be recorded at a higher transfer rate.

With the above constructions, the code information such as characters and figures or code information of audio sound, still pictures, and so on of relatively small amounts, and the moving picture information, can be distinguished from each other so that the former information is treated as digital signals and the later information is treated as analog signals, and the digital and analog signals can be selectively recorded by use of the selection signal which is produced on the basis of an information identifying signal. Moreover, the digital signal can be recorded at a higher transfer rate by simultaneous use of two digital recording circuits so that moving pictures can be recorded not only as analog signals but as digital signal. Therefore, it is possible to construct a wide-application data file apparatus which is able to treat information on a single disc by generalizing and which has a large practical effect.

DESCRIPTION OF THE PREFERRED EMBODIMENTS

Figure 1:
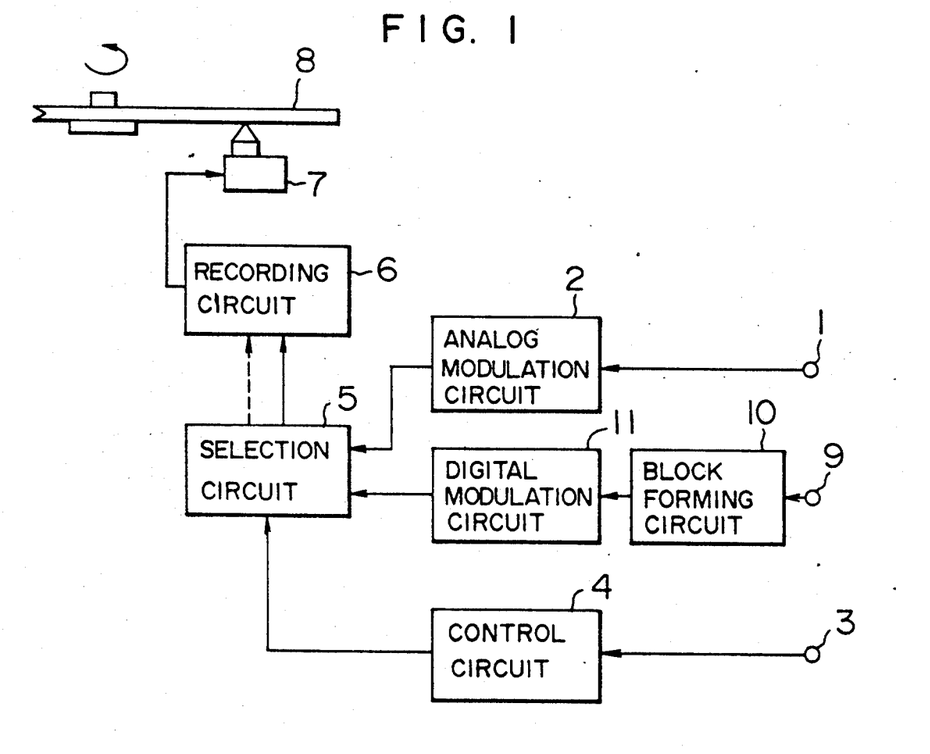
FIG. 1 is a block diagram of an optical disc recording apparatus of this invention.

FIG. 1 is a block diagram of one embodiment of an optical disc recording apparatus of this invention.

Referring to FIG. 1, there are shown an analog signal input terminal 1, an analog modulation circuit 2, a system control signal input terminal 3, a control circuit 4, a selection circuit 5, an analog/digital signal recording circuit 6, a pickup 7, an optical disc 8, a digital signal input terminal 9, a block forming circuit 10 and a digital modulation circuit 11.

The operation of the first embodiment shown in FIG. 1 will be described with reference to the selection circuit of FIG. 2, the recording circuit of FIG. 3, and the digital modulation circuit of FIG. 4.

Figure 2:
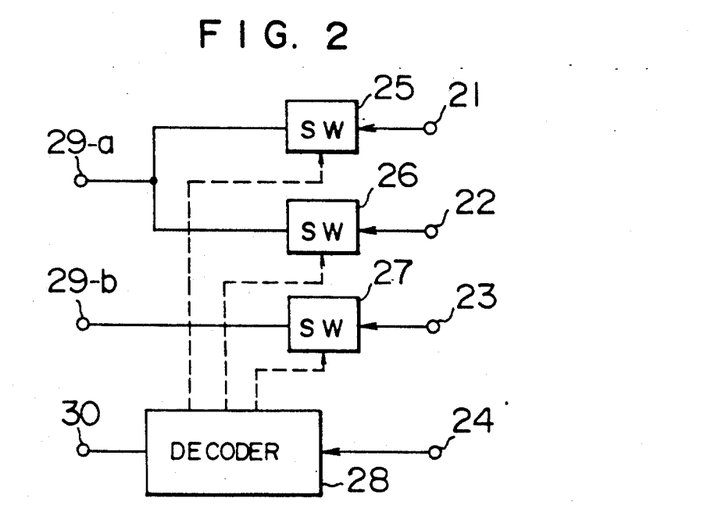
FIG. 2 is a diagram of a selection circuit which is one element constituting the apparatus of this invention.

In FIG. 2, there are shown signal input terminals 21, 22 and 23, a control signal input terminal 24, switch circuits 25, 26 and 27, a decoder 28, signal output terminals 29-a and 29-b, and a selection signal output terminal 30.

Figure 3:
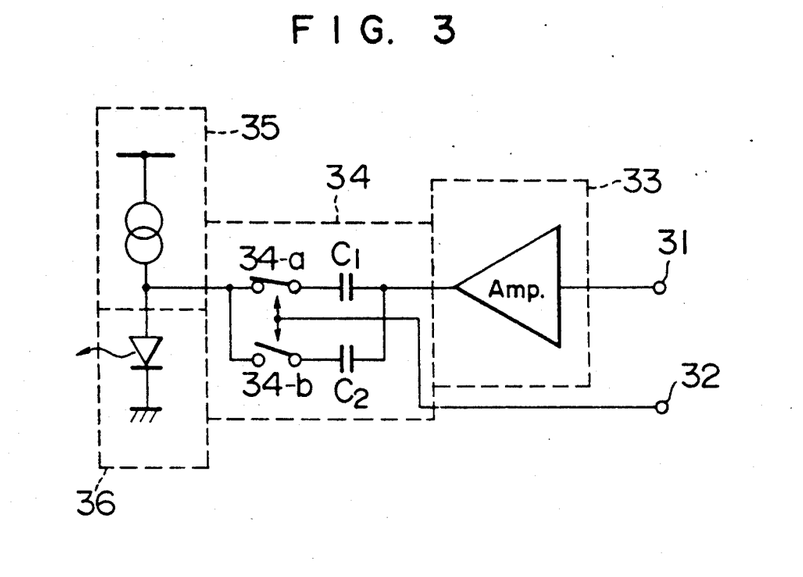
FIG. 3 is a diagram of a recording circuit which is another element constituting the apparatus of this invention and which enables both analog signal and digital signal to be recorded.

In FIG. 3, there are shown a recording signal input terminal 31, a selection signal input terminal 32, an amplifying circuit 33, a band limiting circuit 34, a capacitor C1 side switch 34-a, a capacitor C2 side switch 34-b, a laser drive circuit 35, and a laser element 36.

Figure 4:
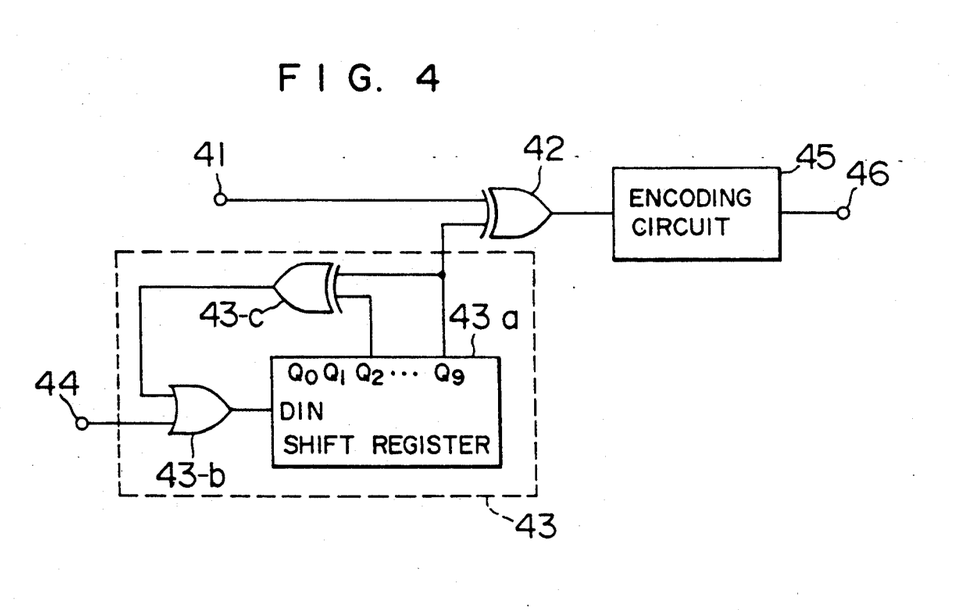
FIG. 4 is a diagram of a digital modulation circuit constituting still another element of the apparatus of this invention.

In FIG. 4, there are shown an input terminal 41, an exclusive logical OR circuit (Ex-OR) 42, an M-series random signal generating circuit 43, a shift register 43-a, a logical OR circuit (OR) 43-b, an exclusive logical OR circuit 43-c, a start control terminal 44, an encoding circuit 45, and a digital modulation output terminal 46.

The optical disc recording apparatus of this embodiment of the invention is able to record analog moving pictures and digital still pictures/audio sound/characters/figures on one disc. The operation for recording analog moving pictures as analog signals and then for recording still pictures/audio signals as digital signals will be described below.

An analog moving picture signal such as an NTSC television signal is supplied via the analog signal terminal 1 shown in FIG. 1 to the analog modulation circuit 2. In the analog modulation circuit 2, the input signal is a frequency-modulated signal. The output signal from the analog modulation circuit 2 is supplied to the signal input terminal 21 of the selection circuit 5 shown in the block diagram of FIG. 2.

On the other hand, a system control signal for ordering recording of the analog signal is supplied via the system control signal input terminal 3 from, for example, a host computer to the control circuit 4. The control circuit 4 generates a control signal for analog signal recording and supplies it to the control signal terminal 24 of the selection circuit 5 shown in FIG. 2.

In the selection circuit 5 shown in FIG. 2, the control signal supplied to the control signal terminal 24 is interpreted by the decoder 28 and used for controlling the switch circuits 25, 26 and 27 to turn on/off. Here, the switch circuit 25 is turned on by the signal from the decoder 28, and the switch circuits 26 and 27 are turned off by the signal. Thus, the analog moving picture signal supplied from the analog modulation circuit 2 to the signal input terminal 21 of the selection circuit 5 is passed through the switch circuit 25 which is in the on state, and fed to the signal output terminal 29-a. Then, the analog moving picture signal from the signal output terminal 29-a is supplied to the recording signal input terminal 31 of the recording circuit 6 shown in the block diagram of FIG. 3. At the same time, the decoder 28 produces a selection signal for analog signal recording at the selection signal output terminal 30 and then supplies it to the selection signal input terminal 32 of the recording circuit 6 shown in FIG. 3.

In the recording circuit 6 shown in FIG. 3, the analog moving picture signal at the recording signal input terminal 31 is amplified by the amplifying circuit 33, and supplied to the band limiting circuit 34. On the other hand, the selection signal at the selection signal input terminal 32 is supplied to the band limiting circuit 34, controlling the capacitor Cl side switch 34-a to be turned on and the switch 34-b to be turned off. The band limiting circuit 34 has the characteristics of a high-pass filter which depends on the capacitance of the capacitor Cl and the input resistance of the laser drive circuit 35. That is, this characteristic passes the band necessary for recording and reproduction of the input analog moving picture signal, and rejects at a cutoff frequency the low-frequency components which would adversely affect the servo characteristic of the optical disc. Generally in apparatus which use optical discs for recording media, necessary information is obtained from preformated grooves and signals on the disc. An error signal in a focus and tracking servo is produced by the same optical system and light sensor as is the main signal. The servo error signal is important mainly in the low-frequency region (lower than several 10 kHz). In other words, when the modulated main signal includes much low-frequency components, the S/N ratio of the servo error signal deteriorates, making servo stability poor. Therefore, if the low-frequency component of the input signal which has adverse effects on the servo, is suppressed as much as possible, it is possible to stably record and reproduce. Thus, when passing through the capacitor Cl and switch 34-a of the band limiting circuit 34, the analog moving picture signal amplified by the amplifying circuit 33 is suppressed in its low-frequency components by the characteristics of the elements, and then it is supplied to the laser drive circuit 35. In the laser drive circuit 35, the laser device 36 is excited by the analog moving picture signal. The analog moving picture signal is recorded by the pickup 7 onto the optical disc 8 as an on/off signal according to the emitted light pattern.

The operation for recording the digital signal of still pictures, audio sound, characters/figures will be described. Here, the recording of audio signal will next be mentioned. The audio signal is supplied via the digital signal input terminal 9 shown in FIG. 1 to the block forming circuit 10. In the block forming circuit 10, the input digital signal is partitioned into sectors of an information unit each, and an error correction code is added to each sector so as to assure the reliability of information. The output signal from the block forming circuit 10 is supplied to the input terminal 41 of the digital modulation circuit 11 shown in the block diagram of FIG. 4.

The digital modulation circuit 11 in FIG. 4 suppresses the low-frequency components of the input digital signal and encodes it for high-density recording on the optical disc. Since the digital signal normally has low-frequency components close to DC in the spectrum, the digital signal must be processed by the circuit for suppressing low-frequency components for the same reasons as when the analog signal is recorded. In FIG. 4, the audio signal fed through the input terminal 41 is supplied to one input terminal of the two-input exclusive logical OR circuit 42. The random data generated from the M-series random signal generating circuit 43 is supplied to the other terminal of the exclusive logical OR circuit 42. The M-series random signal generator 43 in this embodiment comprises the shift register 43-a, logical OR circuit 43-b, and exclusive logical OR circuit 43-c, and produces random data expressed in $1+x^4+x^9$ (x is a variable). If an on/off signal is supplied sector by sector from a host computer to the start control terminal 44, the digital audio signal which is random-processed at every sector is produced from the exclusive logical OR circuit 42. Moreover, the encoding circuit 45 encodes the output signal from the exclusive logical OR circuit to be suitable for high-density recording such as 2-7RLL code (run length limited code). As a result, the audio signal suppressed in its low-frequency components and encoded is produced from the output terminal 46.

The audio signal produced from the output terminal 46 of the digital modulation circuit 11 is fed to the input terminal 22 of the selection circuit 5 shown in FIG. 2. The system control signal which orders recording of the digital signal is supplied from the host computer via the system control signal input terminal 3 to the control circuit 4. The control circuit 4 generates the control signal for digital signal recording, and supplies it to the control signal terminal 24 of the selection circuit 5 shown in FIG. 2.

In the selection circuit 5 of FIG. 2, the input control signal at the control terminal 24 is interpreted at the decoder 28, and the signal from the decoder 28 controls the switch circuit 26 to turn on and the switch circuits 25 and 27 to turn off. Thus, the audio signal fed from the digital modulation circuit 11 to the signal input terminal 22 of the selection circuit 5 can be passed through the switch circuit 26 which is in the on state, and fed to the signal output terminal 29-a. The audio signal from the signal output terminal 29-a is supplied to the recording signal input terminal 31 of the recording circuit 6 shown in FIG. 3. At the same time, the decoder 28 produces the selection signal for digital signal recording at the selection signal output terminal 30. This selection signal is supplied to the selection signal input terminal 32 of the recording circuit 6 shown in FIG. 3.

In the recording circuit of FIG. 3, the encoded audio signal fed to the recording signal input terminal 31 is amplified by the amplifying circuit 33, and supplied to the band-limiting circuit 34. The selection signal supplied to the selection signal input terminal 32 is supplied to the band limiting circuit 34, controlling the capacitor C2 side switch 34-b to turn on, and the switch 34-a to turn off. The characteristics of the band limiting circuit 34 depends on the capacitance of the capacitor C2 and the input resistance of the laser drive circuit 35. This time, unlike the case of analog signal, the characteristic has a cutoff frequency low enough to pass all the band of the digital input signal including the low-frequency component of the signal. Here, the low-frequency component having adverse effects on the servo system is passed, but causes no problem because the low-frequency component having adverse effects was suppressed by the low-frequency component suppressing circuit using the M-series random signal generating circuit 43 of the digital modulation circuit 11 shown in FIG. 4. As a result, the capacitance of the capacitor C1 is selected to be very much smaller than that of the capacitor C2, or C1<C2. Thus, the digital audio signal, when passing through the capacitor C2 and switch 34-b of the band limiting circuit 34, has all the necessary band of the digital signal assured, and it is supplied to the laser drive circuit 35. In the laser drive circuit 35, the laser device 36 is excited by this audio signal. The audio signal is recorded on the optical disc 8 as an on-/off signal according to the emitted light pattern.

Similarly, the still picture signal and character/figure signal are supplied in a form of digital signal to the digital input terminal 9, and processed in the same manner as described above.

Although the position at which the information is recorded on the disc is not mentioned above, the analog moving picture or still picture/audio sound and characters/figures are recorded on different areas on one disc. While the characteristics of the band limiting circuit are determined by the values of the capacitors C1 and C2 as described above, the band limiting circuit is not limited thereto as long as it meets the gist of the invention.

Description will be made of the case of recording the digital signal having a large capacity of information per unit of signal and which is thus required to be recorded at a higher transfer rate. The capacity of data per unit of signal of, for example, the High Definition TV still picture has about 5 times that of the present NTSC television. Thus, if the High definition TV still picture is recorded on the optical recording apparatus at a low rate, the recording time becomes long, and thus high-rate recording is required. Moreover, when the digital moving picture signal into which the NTSC analog moving picture signal is converted is recorded on the optical disc in real time, the recording must be made at a high transfer rate. If the moving picture is of composite type, the rate of about 60 mega-bits per sec is necessary. Thus, the information having a large amount of information per unit of signal and to be recorded at a high transfer rate absolutely needs a recording circuit for high-rate recording.

Figure 5:
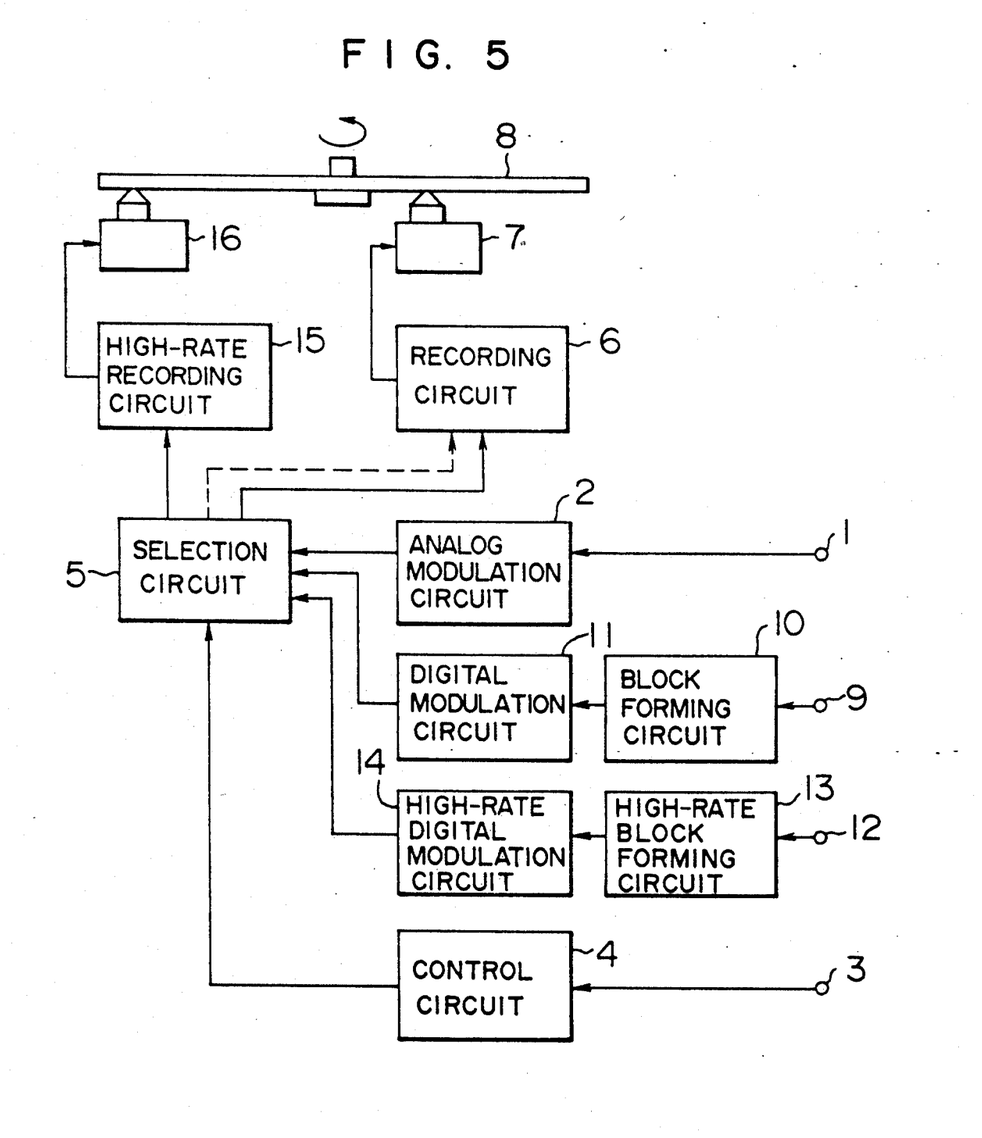
FIG. 5 is a block diagram of another optical recording apparatus of the invention.
Figure 6:
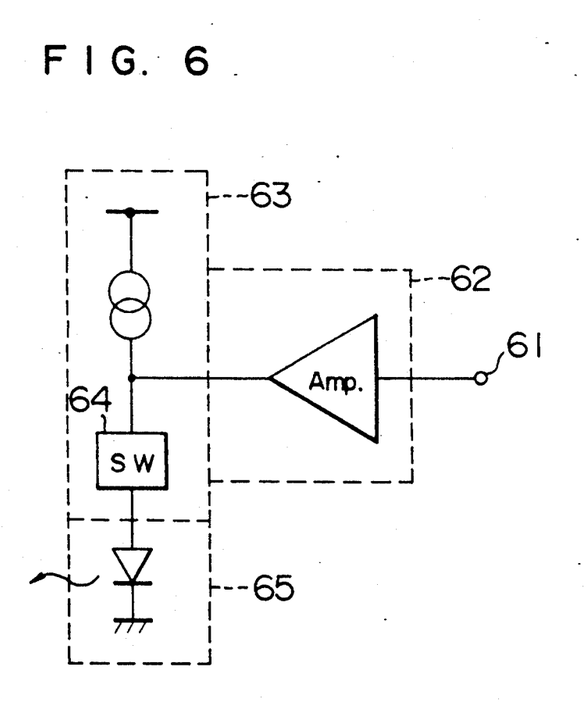
FIG. 6 is a diagram of a recording circuit exclusive for digital signal.

FIG. 5 is a block diagram of a second embodiment of an optical disc recording apparatus. This embodiment includes two recording circuits; the recording circuit 6 capable of processing both digital signal and analog signal to be recorded as shown in FIG. 1, and a recording circuit is exclusively for high-rate recording of digital signals as shown in FIG. 6. In FIG. 5, elements 1 to 11 are the same as in FIG. 1, 12 represents a high-rate digital signal input terminal, 13 a high-rate block forming circuit, 14 a high-rate digital modulation circuit, 15 a recording circuit exclusively for high-rate recording of digital signals, and 16 a pickup exclusively for high-rate recording. In FIG. 6, there are shown a recording signal input terminal 61, an amplifying circuit 62, a laser drive circuit 63, a switch circuit 64 and a laser device 65.

The operation of the optical disc recording apparatus constructed as shown in FIG. 5 will be mentioned. In this case, for example, a moving picture is recorded in a form of digital signal. First, an NTSC composite moving picture signal is converted from the analog form into a digital signal of about 60 mega-bits/sec, and divided into signals of 20 mega-bits/sec and 40 mega-bits/sec, respectively. The 20 mega-bits/sec signal is supplied to the digital signal input terminal 9 as in the recording of audio sound, and supplied to the block forming circuit 10. The 40 mega-bits/sec signal is supplied to the high-rate digital signal input terminal 12 and then to the high-rate block forming circuit 13. The 20 mega-bits/sec signal fed to the block forming circuit 10, similarly as in the above recording of the audio signal, is recorded through the selection circuit 5 and the recording circuit 6 on the optical disc 8 by the pickup 7 which is diposed close to the inner periphery of the optical disc 8. The output signal from the high-rate block forming circuit 13 is supplied to the high-rate digital modulation circuit 14. The high-rate digital modulation circuit 14 is of a high-rate type and has the same function as the digital modulation circuit 11. Thus, the digital modulation circuit 14 suppresses the low-frequency components of the input digital signal, and encodes for high-density recording on the optical disc at a high speed. The output from the high-rate digital modulation circuit 14 is supplied to the input terminal 23 of the selection circuit 5 shown in FIG. 2. The system control signal for commanding to record the high-rate digital signal is supplied from the host computer to the system control signal input terminal 3 and then to the control circuit 4. The control circuit 4 generates the control signal for high-rate digital signal recording, and supplies it to the control signal terminal 24 of the selection circuit 5 shown in FIG. 2. In the selection circuit 5 of FIG. 2, the input control signal at the control terminal 24 is interpreted by the decoder 28 and controls the switch circuit 27 to turn on and the switch circuits 25 and 26 to turn off. Thus, the high-rate digital signal supplied from the high-rate digital modulation circuit 14 to the signal input terminal 23 of the selection circuit 5 can be passed through the switch circuit 27 that is in the on state, and fed to the signal output terminal 29-b. The high-rate digital signal from the signal output terminal 29-b is supplied to the recording signal input terminal 31 of the recording circuit 15 shown in FIG. 6.

In the recording circuit 15 of FIG. 6, the high-rate digital signal fed to the recording signal input terminal 61 is amplified by the amplifying circuit 62, and supplied to the laser drive circuit 63. In the laser drive circuit 63, the switch circuit 64 is turned on and off by the recording signal, thus exciting the laser intermittently. The laser light is irradiated on the disc 8 from the pickup 16 that is positioned close to the outer periphery of the disc. Thus, the 40 mega-bits/sec high-rate digital signal is recorded on the surface of the disc 8 as an on/off signal.

The operation has been described of each of the 20 mega-bits/sec signal and the 40 mega-bits/sec signal supplied to the digital signal input terminal 9 and high-rate digital input terminal 12. In this way, when the high transfer rate digital signal is divided into two signals, which are supplied to digital input terminals at a time, and when the control signal is supplied from a host computer to the system control terminal 3 so that the two signals can be simultaneously recorded on the optical disc 8, the recording rate can be increased as compared with the prior art and the moving picture can also be recorded in a form of a digital signal.

What is claimed is:
1. An optical disc recording apparatus for selectively recording on an optical disc analog and digital signals, comprising:
an analog modulation circuit for receiving and modulating an analog input signal to produce first modulated signals for optical disc recording;
a block forming circuit for receiving and dividing a digital input signal into sector blocks;
a digital modulation circuit for suppressing low-frequency components of said sector blocks from the block forming circuit and modulating the low-frequency suppressed sector blocks to produce second modulated signals for optical disc recording;

a control circuit for producing a recording control signal for designating one of analog signal recording and digital signal recording in response to the received analog and the received digital input signals, respectively;

a selection circuit connected to said analog modulation circuit, said digital modulation circuit and said control circuit, said selection circuit for selecting and passing therethrough one of said first and said second modulated signals and to produce a selection signal representing the selected one of the modulated signals, in response to said recording control signal form said control circuit; and a recording circuit including a laser drive circuit, for selectively limiting the frequency band of the selected and passed modulated signals in accordance with the selection signal produced by the selection circuit, the limited frequency band modulated signals being recorded on said optical disc by the laser drive circuit;

wherein said recording circuit comprises an amplifying circuit for amplifying said modulated signals;

a band limiting circuit for selectively limiting the frequency band of said modulated signals in response to the selection signal; and a laser drive circuit for driving a laser with the output of said band limiting circuit; and wherein said band limiting circuit has at least one capacitor for receiving the modulated signals and wherein a frequency response characteristic of the band limiting circuit is dependent on the capacitance of the at least one capacitor and the input impedance of said laser drive circuit.

2. An optical disc recording apparatus for selectively recording on an optical disc digital and analog signals, comprising:

an analog modulation circuit for receiving and modulating an analog input signal to produce first modulated signals for optical disc recording;

a block forming circuit for receiving and dividing low transmission rate digital signals into first sector blocks;

a digital modulation circuit for suppressing low-frequency components of said first sector blocks from the block forming circuit and modulating the low-frequency suppressed first sector blocks to produce second modulated signals for optical disc recording;

a high-speed block forming circuit for receiving and dividing high transmission rate digital signal into second sector blocks;

a high-speed digital modulation circuit for suppressing low-frequency components of said second sector blocks from the high-speed block forming circuit and modulating the low-frequency suppressed second sector blocks to produce third modulated signals for optical disc recording at a high speed;

a control circuit for producing at least one recording control signal in correspondence with the received analog, low transmission rate digital, and high transmission rate digital input signals, respectively;

a selection circuit, connected to the analog modulation circuit, the digital modulation circuits, and the control circuit, the selection circuit for selecting and passing therethrough at least one of said first, second and third modulated signals, and for producing at least one selection signal representing the selected modulated signals, in response to said at least one recording control signal from said control circuit;

a recording circuit including a first laser drive circuit, for selectively limiting frequency bands of said first and second modulated signals selected and passed by said selection circuit in accordance with the at least one selection signal and supplying the frequency band limited signals to the first laser drive circuit for recording on said optical disc; and a high-rate recording circuit including a second laser drive circuit, for receiving the third modulated signals selected and passed by said selection circuit in accordance with the at least one selection signal and supplying the signals to the second laser drive circuit for recording on said optical disc;

wherein said recording circuit comprises an amplifying circuit for amplifying said modulated signals;

a band limiting circuit for selectively limiting the frequency band of said modulated signals in response to the selection signal; and a laser drive circuit for driving a laser with the output of said band limiting circuit; and wherein said band limiting circuit has at least one capacitor for receiving the modulated signals and wherein a frequency response characteristic of the band limiting circuit is dependent on the capacitance of the at least one capacitor and the input impedance of said laser drive circuit.

3. In an optical disc device including an optical disc, an apparatus for selectively processing and recording on the optical disc analog and digital input signals, comprising:

analog modulation means for receiving analog input signals and producing modulated analog output signals;

block forming means for receiving digital input signals, partitioning the digital input signals into sectors containing sector data, adding error code data to each sector, and producing sector data signals;

digital modulation means for receiving the sector data signals, digitally modulating the sector data signals to suppress low-frequency components, encoding the sector data signals, and producing encoded modulated digital output signals;

selection means for receiving an external signal indicative of whether the input signals are analog or digital input signals, selecting one of the modulated analog output signals and the encoded modulated digital output signals based on the external signal, and producing a selection signal indicating which of the output signals is selected; and recording means for receiving as an input recording signal the output signal selected by the selection means, amplifying the input recording signal, receiving the selection signal from the selection means, filtering the amplified input recording signal based on the selection signal, and recording the amplified filtered input recording signal on the optical disc;

wherein the block forming means is divided into first and second block forming circuits, the first block forming circuit receiving 20 megabits per second digital input signals, and the second block forming circuit receiving 40 megabits per second digital input signals, the first and second block forming circuits producing first and second sector data signals respectively;

the digital modulation means is divided into first and second digital modulation circuits, the first and second digital modulation circuits receiving a respective one of the first and second sector data signals, the first and second digital modulation circuits producing first and second encoded modulated digital output signals respectively;

the external signal received by the selection means further indicates whether the digital input signals are 20 megabit or 40 megabit per second digital input signals, the selection means further selecting one of the first and second encoded modulated digital output signals based on the external signal; and the recording means is divided into first and second recording circuits, the first and second recording circuits receiving a respective one of the first and second encoded modulated digital output signals selected by the selection means as first and second input recording signals; and wherein the first recording circuit comprises:

a first amplifier connected to receive respective output signals selected by the selection means;

a pair of switches controlled by the selection signal so that when one is open the other is closed, each switch at first terminals thereof connected in series with a respective capacitor, the series connections of a switch and a capacitor being connected in parallel, the capacitors connected together at first terminals thereof to receive an output from the first amplifier, the switches connected together at second terminals thereof to provide a high-pass filtered output signal; and a first laser circuit including a first laser element and a first driving element, the first laser circuit connected to receive the high-pass filtered output signals from the switches and for recording the signals on the optical disc;

and wherein the second recording circuit comprises:

a second amplifier connected to receive respective output signals selected by the selection means; and a second laser circuit including a second laser element, a second driving element, and a laser switch circuit, the laser switch circuit connected to receive output signals from the second amplifier for switching the second laser on and off and thereby record signals on the optical disc.

4. The apparatus according to claim 3, wherein the first and second recording circuits record the first and second input recording signals at different respective locations on the optical disc simultaneously.

5. In an optical disc device including an optical disc, an apparatus for selectively processing and recording on the optical disc analog and digital input signals, comprising:

analog modulation means for receiving analog input signals and producing modulated analog output signals;

block forming means for receiving digital input signals, partitioning the digital input signals into sectors containing sector data, adding error code data to each sector, and producing sector data signals;

digital modulation means for receiving the sector data signals, digitally modulating the sector data signals to suppress low-frequency components, encoding the sector data signals, and producing encoded modulated digital output signals;

selection means for receiving an external signal indicative of whether the input signals are analog or digital input signals, selecting one of the modulated analog output signals and the encoded modulated digital output signals based on the external signal, and producing a selection signal indicating which of the output signals is selected; and recording means for receiving as an input recording signal the output signal selected by the selection means, amplifying the input recording signal, receiving the selection signal form the selection means, filtering the amplified input recording signal based on the selection signal, and recording the amplified filtered input recording signal on the optical disc;

wherein the recording means comprises:

an amplifier connected to receive the output signals selected by the selection means;

a pair of switches controlled by the selection signal so that when one is open the other is closed, each switch at first terminals thereof connected in series with a respective capacitor, the series connections of a switch and a capacitor being connected in parallel, the capacitors connected together at first terminals thereof to receive an output from the amplifier, the switches connected together at second terminals thereof to provide a high-pass filtered output signal; and a laser circuit including a laser element and a driving element, the laser circuit connected to receive the high-pass filtered output signals from the switches and for recording the signals on the optical disc.

6. In an optical disc device including an optical disc, an apparatus for selectively processing and recording on the optical disc analog and digital input signals, comprising:

analog modulation means for receiving analog input signals and producing modulated analog output signals;

block forming means for receiving digital input signals, partitioning the digital input signals into sectors containing sector data, adding error code data to each sector, and producing sector data signals;

digital modulation means for receiving the sector data signals, digitally modulating the sector data signals to suppress low-frequency components, encoding the sector data signals, and producing encoded modulated digital output signals;

selection means for receiving an external signal indicative of whether the input signals are analog or digital input signals, selecting one of the modulated analog output signals and the encoded modulated digital output signals based on the external signal, and producing a selection signal indicating which of the output signals is selected; and recording means for receiving as an input recording signal the output signal selected by the selection means, amplifying the input recording signal, receiving the selection signal form the selection means, filtering the amplified input recording signal based on the selection signal, and recording the amplified filtered input recording signal on the optical disc;

wherein the digital modulation means comprises:

random signal generating means for generating a random signal;

logic means, operatively coupled to the random signal generating means and the block forming means, the logic means for receiving at a first input the random signal from the random signal generating means, for receiving at a second input the sector data signals from the block forming means, and for producing random processed signals at an output thereof; and encoding means, operatively coupled to the logic means, for receiving at an input the random processed signals from the logic means, and for producing the encoded modulated digital output signals at an output thereof; and wherein the random signal generating means comprises:

a shift register having a data input terminal and data output terminals, one of the data output terminals providing the random signal thereon;

an exclusive OR gate having input terminals thereof connected to the data output terminals of the shift register; and an OR gate having a first input terminal connected to an output of the exclusive OR gate, a second input terminal for receiving a start control signal from an external device, and an output terminal connected to the data input terminal of the shift register.

7. The apparatus according to claim 6, wherein the encoding means comprises a 2-7 run length limited encoder.

* * * * *